United States Patent
Metwaly Saad et al.

(10) Patent No.: US 12,068,832 B2
(45) Date of Patent: Aug. 20, 2024

(54) BEAM SELECTION AND CODEBOOK LEARNING BASED ON XR PERCEPTION

(71) Applicant: QUALCOMM Incorporated, San Diego, CA (US)

(72) Inventors: Hussein Metwaly Saad, San Diego, CA (US); Peerapol Tinnakornsrisuphap, San Diego, CA (US); Tom Edward Botterill, San Diego, CA (US); Yann Lebrun, Viroflay (FR); Ravi Agarwal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 3 days.

(21) Appl. No.: 17/457,008

(22) Filed: Nov. 30, 2021

(65) Prior Publication Data
US 2023/0170976 A1    Jun. 1, 2023

(51) Int. Cl.
*H04B 7/08*     (2006.01)
*H04W 24/10*    (2009.01)

(52) U.S. Cl.
CPC .......... *H04B 7/088* (2013.01); *H04B 7/0857* (2013.01); *H04B 7/086* (2013.01); *H04W 24/10* (2013.01)

(58) Field of Classification Search
CPC ...... H04B 7/088; H04B 7/0857; H04B 7/086; H04W 24/10
See application file for complete search history.

(56) References Cited

U.S. PATENT DOCUMENTS

| 7,587,172 B2 * | 9/2009 | Kim ...................... H04L 1/0675 |
| | | 455/562.1 |
| 8,254,487 B2 * | 8/2012 | Tsai ...................... H04B 7/0684 |
| | | 375/267 |

(Continued)

FOREIGN PATENT DOCUMENTS

| CA | 3072751 A1 * | 3/2019 | ............ H04B 7/022 |
| CN | 110892364 A * | 3/2020 | ......... G02B 27/0093 |

(Continued)

OTHER PUBLICATIONS

Extended Reality (XR) in 5G, 3GPP TR 26.928 (ETSI TR 126 928) V16.1.0, Jan. 2021 (Year: 2021).*

(Continued)

*Primary Examiner* — Berhanu Tadese
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for beam selection and codebook learning techniques based on XR perception information. A UE may receive sensor information indicative of a direction of a current serving beam relative to the UE. The UE may be configured to communicate with a base station based on a BPL associated with the direction of the current serving beam. The UE may perform a measurement for the base station and the UE to communicate over the BPL based on the sensor information indicating that the direction of the current serving beam relative to the UE is different from a previous serving beam direction relative to the UE.

25 Claims, 9 Drawing Sheets

(56) References Cited

U.S. PATENT DOCUMENTS

| | | | |
|---|---|---|---|
| 8,351,544 B2* | 1/2013 | Mondal | H04B 7/0639 375/267 |
| 8,599,946 B2* | 12/2013 | Kim | H04B 7/0469 375/267 |
| 8,639,198 B2* | 1/2014 | Liu | H04B 7/0639 455/67.11 |
| 8,743,992 B2* | 6/2014 | Enescu | H04B 7/0486 375/267 |
| 8,750,419 B2* | 6/2014 | Mondal | H04B 7/0417 375/267 |
| 9,203,660 B2* | 12/2015 | Wu | H04B 7/0469 |
| 9,281,881 B2* | 3/2016 | Onggosanusi | H04B 7/0469 |
| 9,425,871 B2* | 8/2016 | Onggosanusi | H04B 7/0626 |
| 9,490,883 B2* | 11/2016 | Schober | H04B 7/0478 |
| 9,602,180 B2* | 3/2017 | Song | H04B 7/0478 |
| 9,838,095 B2* | 12/2017 | Rahman | H04B 7/0456 |
| 9,935,695 B2* | 4/2018 | Wernersson | H04B 7/0469 |
| 10,050,754 B2* | 8/2018 | Li | H04B 7/0478 |
| 10,270,504 B2* | 4/2019 | Park | H04B 7/063 |
| 10,304,239 B2* | 5/2019 | Gorur Sheshagiri | G06T 13/40 |
| 10,340,989 B2* | 7/2019 | Rahman | H04B 7/04 |
| 10,361,760 B2* | 7/2019 | Onggosanusi | H04B 7/0478 |
| 10,410,182 B1* | 9/2019 | Tang | G06T 7/001 |
| 10,411,773 B2* | 9/2019 | Faxér | H04B 7/0469 |
| 10,439,691 B2* | 10/2019 | Park | H04B 7/0626 |
| 10,446,119 B1* | 10/2019 | Lakshmikantha | G09G 3/003 |
| 10,469,142 B2* | 11/2019 | Faxér | H04B 7/0478 |
| 10,476,575 B2* | 11/2019 | Park | H04B 7/06 |
| 10,517,061 B1* | 12/2019 | Kumar | H04W 24/08 |
| 10,608,715 B2* | 3/2020 | Faxér | H04B 7/0469 |
| 10,666,342 B1* | 5/2020 | Landis | H04B 17/318 |
| 10,680,695 B2* | 6/2020 | Davydov | H04B 7/0469 |
| 10,735,066 B2* | 8/2020 | Mo | H04B 7/0482 |
| 10,742,280 B2* | 8/2020 | Onggosanusi | H04B 7/046 |
| 10,767,997 B1* | 9/2020 | Gorur Sheshagiri | G06V 10/80 |
| 10,783,714 B2* | 9/2020 | Diament | G06T 7/70 |
| 10,804,975 B2* | 10/2020 | Kim | H04L 5/0048 |
| 10,812,163 B2* | 10/2020 | Chang | H04B 7/0634 |
| 10,819,412 B2* | 10/2020 | Park | H04B 7/0479 |
| 10,820,323 B2* | 10/2020 | Ho | H04W 76/27 |
| 10,897,290 B2* | 1/2021 | Park | H04B 7/0473 |
| 10,903,892 B2* | 1/2021 | Kang | H04L 1/1819 |
| 10,924,163 B2* | 2/2021 | Davydov | H04B 7/0658 |
| 10,972,162 B2* | 4/2021 | Faxér | H04L 5/0048 |
| 10,979,917 B2* | 4/2021 | Luo | H04W 24/04 |
| 10,998,942 B2* | 5/2021 | Kim | H04B 7/0417 |
| 11,018,737 B2* | 5/2021 | Park | H04B 7/0478 |
| 11,018,745 B2* | 5/2021 | Zhang | H04B 7/0626 |
| 11,035,946 B2* | 6/2021 | Pefkianakis | H04W 64/006 |
| 11,044,739 B2* | 6/2021 | Li | H04W 72/569 |
| 11,063,653 B2* | 7/2021 | Ottersten | G06N 20/20 |
| 11,082,115 B2* | 8/2021 | Landis | H04B 17/318 |
| 11,095,342 B2* | 8/2021 | Park | H04B 7/0417 |
| 11,095,348 B2* | 8/2021 | Park | H04B 7/0639 |
| 11,108,444 B2* | 8/2021 | Varatharaajan | H04B 7/0634 |
| 11,153,033 B2* | 10/2021 | Kang | H04B 7/0617 |
| 11,296,758 B2* | 4/2022 | Park | H04B 7/06 |
| 11,316,566 B2* | 4/2022 | Park | H04B 7/06 |
| 11,367,169 B2* | 6/2022 | Chae | G06T 5/60 |
| 11,374,716 B2* | 6/2022 | Guan | H04B 7/0695 |
| 11,418,973 B2* | 8/2022 | Cheraghi | H04W 24/08 |
| 11,463,141 B2* | 10/2022 | Davydov | H04B 7/0626 |
| 11,564,213 B2* | 1/2023 | Guan | H04B 7/0695 |
| 11,581,926 B2* | 2/2023 | Chen | H04B 7/0482 |
| 11,589,355 B2* | 2/2023 | Horn | H04W 76/10 |
| 11,627,541 B2* | 4/2023 | Pezeshki | H04L 5/0023 370/252 |
| 11,632,162 B1* | 4/2023 | Metwaly Saad | H04B 7/0696 375/262 |
| 11,638,281 B2* | 4/2023 | Mo | H04B 7/0691 370/329 |
| 11,652,515 B2* | 5/2023 | Wu | H04B 7/0478 370/329 |
| 11,705,953 B2* | 7/2023 | Kong | H04B 7/06952 375/267 |
| 11,711,789 B2* | 7/2023 | Abedini | H04L 5/0053 370/279 |
| 11,751,186 B2* | 9/2023 | Sakhnini | H04W 24/08 370/329 |
| 11,765,685 B2* | 9/2023 | Yang | H04W 60/04 455/435.1 |
| 11,811,699 B2* | 11/2023 | Abotabl | H04L 1/0009 |
| 11,818,062 B2* | 11/2023 | Joseph | H04L 5/0037 |
| 11,825,499 B2* | 11/2023 | Huang | H04W 72/54 |
| 11,844,009 B2* | 12/2023 | Gurelli | H04B 7/0695 |
| 11,937,097 B2* | 3/2024 | Raghavan | H04B 7/0695 |
| 11,943,033 B2* | 3/2024 | Zhang | H04L 5/14 |
| 2014/0254514 A1* | 9/2014 | Mobasher | H04B 7/0456 370/329 |
| 2014/0301492 A1* | 10/2014 | Xin | H04B 7/0456 375/267 |
| 2016/0013845 A1* | 1/2016 | Onggosanusi | H04B 7/0486 375/267 |
| 2016/0204842 A1* | 7/2016 | Song | H04B 7/0478 375/267 |
| 2018/0367197 A1* | 12/2018 | Yang | H04B 7/0479 |
| 2019/0026936 A1* | 1/2019 | Gorur Sheshagiri | G06F 3/04842 |
| 2019/0113995 A1* | 4/2019 | Kies | G06F 3/0488 |
| 2019/0222275 A1* | 7/2019 | Mo | H04B 7/0482 |
| 2019/0236835 A1* | 8/2019 | Gorur Sheshagiri | G06F 3/0304 |
| 2019/0245608 A1* | 8/2019 | Kakishima | H04W 88/02 |
| 2019/0296814 A1* | 9/2019 | Kakishima | H04B 7/0626 |
| 2019/0326965 A1* | 10/2019 | Yang | H04B 7/0479 |
| 2019/0378476 A1* | 12/2019 | Jeon | G09G 3/002 |
| 2020/0044702 A1* | 2/2020 | Kakishima | H04L 5/0051 |
| 2020/0177251 A1* | 6/2020 | Raghavan | H04B 17/382 |
| 2020/0177266 A1* | 6/2020 | Kang | H04L 5/0055 |
| 2020/0195333 A1* | 6/2020 | Li | H04W 72/04 |
| 2020/0211506 A1* | 7/2020 | Zavesky | G09G 5/12 |
| 2020/0271450 A1* | 8/2020 | Gorur Sheshagiri | G06F 1/163 |
| 2020/0334643 A1* | 10/2020 | Tang | G07C 5/085 |
| 2020/0359435 A1* | 11/2020 | Raghavan | H04W 76/14 |
| 2021/0050890 A1* | 2/2021 | Park | H04W 72/23 |
| 2021/0184748 A1* | 6/2021 | Luo | H04B 7/088 |
| 2021/0194549 A1* | 6/2021 | Faxér | H04B 7/0478 |
| 2021/0242928 A1* | 8/2021 | Park | H04B 7/088 |
| 2021/0250821 A1* | 8/2021 | Ryu | H04W 36/0079 |
| 2021/0258940 A1* | 8/2021 | Kim | H04L 5/0023 |
| 2021/0289517 A1* | 9/2021 | Li | H04L 27/26136 |
| 2021/0297135 A1* | 9/2021 | Kim | H04L 5/0062 |
| 2021/0314218 A1* | 10/2021 | Kang | H04B 7/088 |
| 2021/0359900 A1* | 11/2021 | Pan | H04W 72/21 |
| 2021/0409991 A1* | 12/2021 | Park | H04L 5/0057 |
| 2022/0006496 A1* | 1/2022 | Park | H04W 72/23 |
| 2022/0039139 A1* | 2/2022 | Taherzadeh Boroujeni | H04B 7/0695 |
| 2022/0094418 A1* | 3/2022 | Polese | H04B 7/086 |
| 2022/0124807 A1* | 4/2022 | Hu | H04W 74/006 |
| 2022/0166484 A1* | 5/2022 | Go | H04W 72/046 |
| 2022/0173848 A1* | 6/2022 | Guan | H04B 7/0695 |
| 2022/0174696 A1* | 6/2022 | Kim | H04L 5/001 |
| 2022/0200767 A1* | 6/2022 | Park | H04B 7/0417 |
| 2022/0232590 A1* | 7/2022 | Huang | H04L 5/001 |
| 2022/0286189 A1* | 9/2022 | Svendsen | H04B 7/0617 |
| 2022/0317781 A1* | 10/2022 | Loghin | G06F 3/013 |
| 2022/0321192 A1* | 10/2022 | Katla | G06N 3/084 |
| 2022/0353028 A1* | 11/2022 | Guan | H04L 5/0094 |
| 2022/0368399 A1* | 11/2022 | Gao | H04W 24/08 |
| 2022/0399921 A1* | 12/2022 | Park | H04W 72/23 |
| 2022/0399959 A1* | 12/2022 | Berliner | H04L 1/1854 |
| 2022/0416861 A1* | 12/2022 | Manolakos | H04L 1/0029 |
| 2023/0033336 A1* | 2/2023 | Awoniyi-Oteri | H04B 7/063 |
| 2023/0091246 A1* | 3/2023 | Bai | H04B 7/0695 370/252 |
| 2023/0102893 A1* | 3/2023 | Bao | H04W 64/00 455/456.1 |
| 2023/0142160 A1* | 5/2023 | Chen | H04B 7/046 370/329 |

(56) References Cited

U.S. PATENT DOCUMENTS

| | | | | |
|---|---|---|---|---|
| 2023/0145852 A1* | 5/2023 | Ryu | ............... | H04W 72/0446 370/329 |
| 2023/0224904 A1* | 7/2023 | Mondet | ............... | H04W 72/21 370/336 |
| 2024/0039601 A1* | 2/2024 | Elshafie | ............... | H04B 7/0626 |

FOREIGN PATENT DOCUMENTS

| | | | | | |
|---|---|---|---|---|---|
| CN | 111095808 | A | * | 5/2020 | ............ H04B 7/022 |
| CN | 113785503 | A | * | 12/2021 | ............ G06N 3/006 |
| CN | 114375605 | A | * | 4/2022 | ............ H04B 7/0486 |
| CN | 114503452 | A | * | 5/2022 | ............ G06N 3/0481 |
| CN | 114762271 | A | * | 7/2022 | ............ H04B 17/17 |
| CN | 115398820 | A | * | 11/2022 | ............ G06N 20/00 |
| EP | 3655845 | A1 | * | 5/2020 | ........ G02B 27/0093 |
| EP | 3726739 | A1 | * | 10/2020 | ............ H04B 7/0695 |
| EP | 3813416 | A1 | * | 4/2021 | ............ H04B 7/063 |
| EP | 3682552 | B1 | * | 7/2021 | ............ H04B 7/022 |
| EP | 4009538 | A1 | * | 6/2022 | ............ H04B 7/0486 |
| EP | 4009725 | A1 | * | 6/2022 | ............ H04B 7/0617 |
| EP | 4117216 | A1 | * | 1/2023 | ............ H04B 7/0408 |
| EP | 4160968 | A1 | * | 4/2023 | ............ H04B 7/0695 |
| GB | 2579760 | A | * | 7/2020 | ............ A63F 13/213 |
| JP | 6961071 | B2 | * | 11/2021 | ............ H04B 7/0404 |
| JP | 7069195 | B2 | * | 5/2022 | ............ G01V 3/26 |
| JP | 7123195 | B2 | * | 8/2022 | ............ H04B 7/063 |
| JP | 7191941 | B2 | * | 12/2022 | ............ H04B 7/022 |
| WO | WO-2018129319 | A1 | * | 7/2018 | ............ H04B 7/0695 |
| WO | WO-2019018098 | A1 | * | 1/2019 | ........ G02B 27/0093 |
| WO | WO-2019055156 | A1 | * | 3/2019 | ............ H04B 7/022 |
| WO | WO-2019069571 | A1 | * | 4/2019 | ............ G01V 3/26 |
| WO | WO-2019074577 | A1 | * | 4/2019 | ............ G06F 1/3231 |
| WO | WO-2019096195 | A1 | * | 5/2019 | ............ H04B 7/0408 |
| WO | WO-2019186162 | A1 | * | 10/2019 | ............ A63F 13/213 |
| WO | WO-2019226028 | A1 | * | 11/2019 | ............ H04B 17/391 |
| WO | WO-2019235906 | A1 | * | 12/2019 | ............ H04L 27/261 |
| WO | WO-2019245341 | A1 | * | 12/2019 | ............ H04B 7/0408 |
| WO | WO-2020001343 | A1 | * | 1/2020 | ............ H04B 7/063 |
| WO | WO-2020003253 | A1 | * | 1/2020 | ........ G02B 27/0172 |
| WO | WO-2020032621 | A1 | * | 2/2020 | ............ H04B 17/336 |
| WO | WO-2020032685 | A1 | * | 2/2020 | ............ H04B 7/0695 |
| WO | WO-2020040572 | A1 | * | 2/2020 | ............ H04B 7/0404 |
| WO | WO-2020046062 | A1 | * | 3/2020 | ............ H04W 16/28 |
| WO | WO-2020091542 | A1 | * | 5/2020 | ............ H04B 7/0695 |
| WO | WO-2020091543 | A1 | * | 5/2020 | |
| WO | WO-2020091544 | A1 | * | 5/2020 | ............ H04B 7/0456 |
| WO | WO-2020156059 | A1 | * | 8/2020 | ............ H04B 7/0695 |
| WO | WO-2020162735 | A1 | * | 8/2020 | ............ H04B 7/0695 |
| WO | WO-2020176359 | A1 | * | 9/2020 | ............ G01C 21/20 |
| WO | WO-2020204348 | A1 | * | 10/2020 | ............ H04W 16/28 |
| WO | WO-2020204538 | A1 | * | 10/2020 | ............ H04B 7/0417 |
| WO | WO-2020205289 | A1 | * | 10/2020 | ............ H04B 7/0695 |
| WO | WO-2020218645 | A1 | * | 10/2020 | ............ G06N 20/10 |
| WO | WO-2020218655 | A1 | * | 10/2020 | ............ B60W 40/02 |
| WO | WO-2020222998 | A1 | * | 11/2020 | ............ G06N 3/006 |
| WO | WO-2020227414 | A1 | * | 11/2020 | ............ H04B 17/318 |
| WO | WO-2021027750 | A1 | * | 2/2021 | ............ H04B 7/0617 |
| WO | WO-2021032300 | A1 | * | 2/2021 | ............ H04B 7/0617 |
| WO | WO-2021034069 | A1 | * | 2/2021 | ............ H04B 7/0486 |
| WO | WO-2021041859 | A1 | * | 3/2021 | ............ G06N 3/048 |
| WO | WO-2021041993 | A1 | * | 3/2021 | ............ H04B 17/336 |
| WO | WO-2021112592 | A1 | * | 6/2021 | |
| WO | WO-2021126937 | A1 | * | 6/2021 | ............ H04B 17/17 |
| WO | WO-2021183993 | A1 | * | 9/2021 | ............ G01S 13/867 |
| WO | WO-2022011634 | A1 | * | 1/2022 | |
| WO | WO-2022021322 | A1 | * | 2/2022 | ............ H04B 17/309 |
| WO | WO-2022032625 | A1 | * | 2/2022 | ............ H04L 65/611 |
| WO | WO-2022035528 | A1 | * | 2/2022 | ............ H04B 7/15542 |
| WO | WO-2022066843 | A1 | * | 3/2022 | ............ H04B 7/0623 |
| WO | WO-2022159008 | A1 | * | 7/2022 | ............ G06N 3/006 |
| WO | WO-2023004671 | A1 | * | 2/2023 | ............ H04L 41/14 |
| WO | WO-2023070361 | A1 | * | 5/2023 | ............ H04B 17/25 |
| WO | WO-2023082163 | A1 | * | 5/2023 | ............ H04W 28/0215 |

OTHER PUBLICATIONS

Qualcomm Technologies, The Mobile Future of extended Reality (XR), Nov. 2020 (Year: 2020).*

Wang et al., Beam Codebook Learning in mmWave Vehicular Communication, IEEE, May 2021 (Year: 2021).*

* cited by examiner

BEAM SELECTION AND CODEBOOK LEARNING BASED ON XR PERCEPTION

TECHNICAL FIELD

The present disclosure relates generally to communication systems, and more particularly, to beam selection and codebook learning techniques based on extended reality (XR) perception information.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may receive sensor information indicative of a direction of a current serving beam relative to a user equipment (UE), the UE configured to communicate with a base station based on a beam pair link (BPL) associated with the direction of the current serving beam; and perform a measurement for the base station and the UE to communicate over the BPL based on the sensor information indicating that the direction of the current serving beam relative to the UE is different from a previous serving beam direction relative to the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
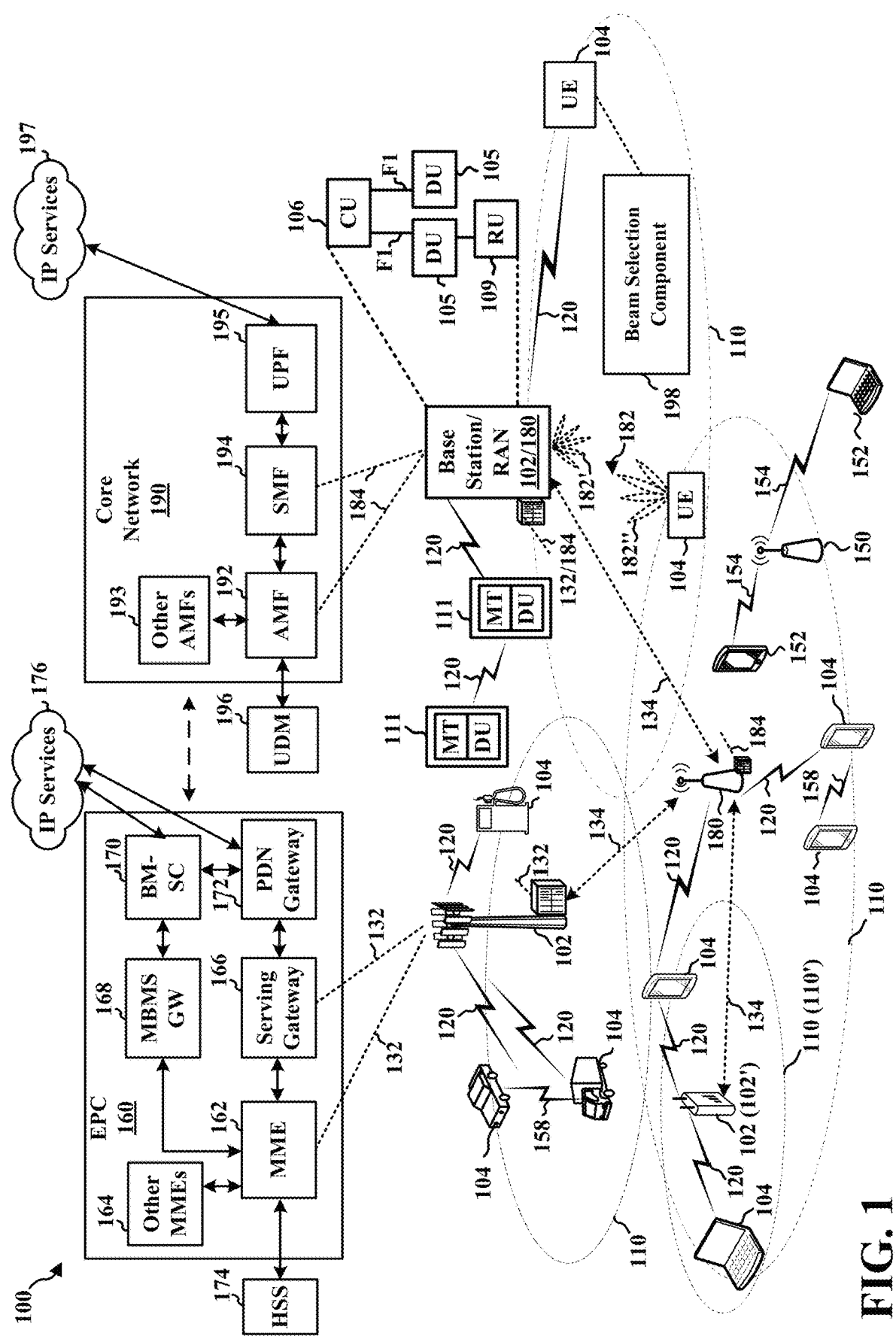
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184 (e.g., an Xn interface), and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range (FR) designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as a gNB may operate in a traditional sub 6 GHz spectrum, in millimeter wave frequencies, and/or near millimeter wave frequencies in communication with the UE 104. When the gNB operates in millimeter wave or near millimeter wave frequencies, the gNB may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a beam selection component 198 configured to receive sensor information indicative of a direction of a current serving beam relative to the UE, the UE configured to communicate with a base station based on a beam pair link (BPL) associated with the direction of the current serving beam; and perform a measurement for the base station and the UE to communicate over the BPL based on the sensor information indicating that the direction of the current serving beam relative to the UE is different from a previous serving beam direction relative to the UE. Although the following description may be focused on 5G NR, the concepts described herein may be applicable to other similar areas, such as LTE, LTE-A, CDMA, GSM, and other wireless technologies.

Figure 2:
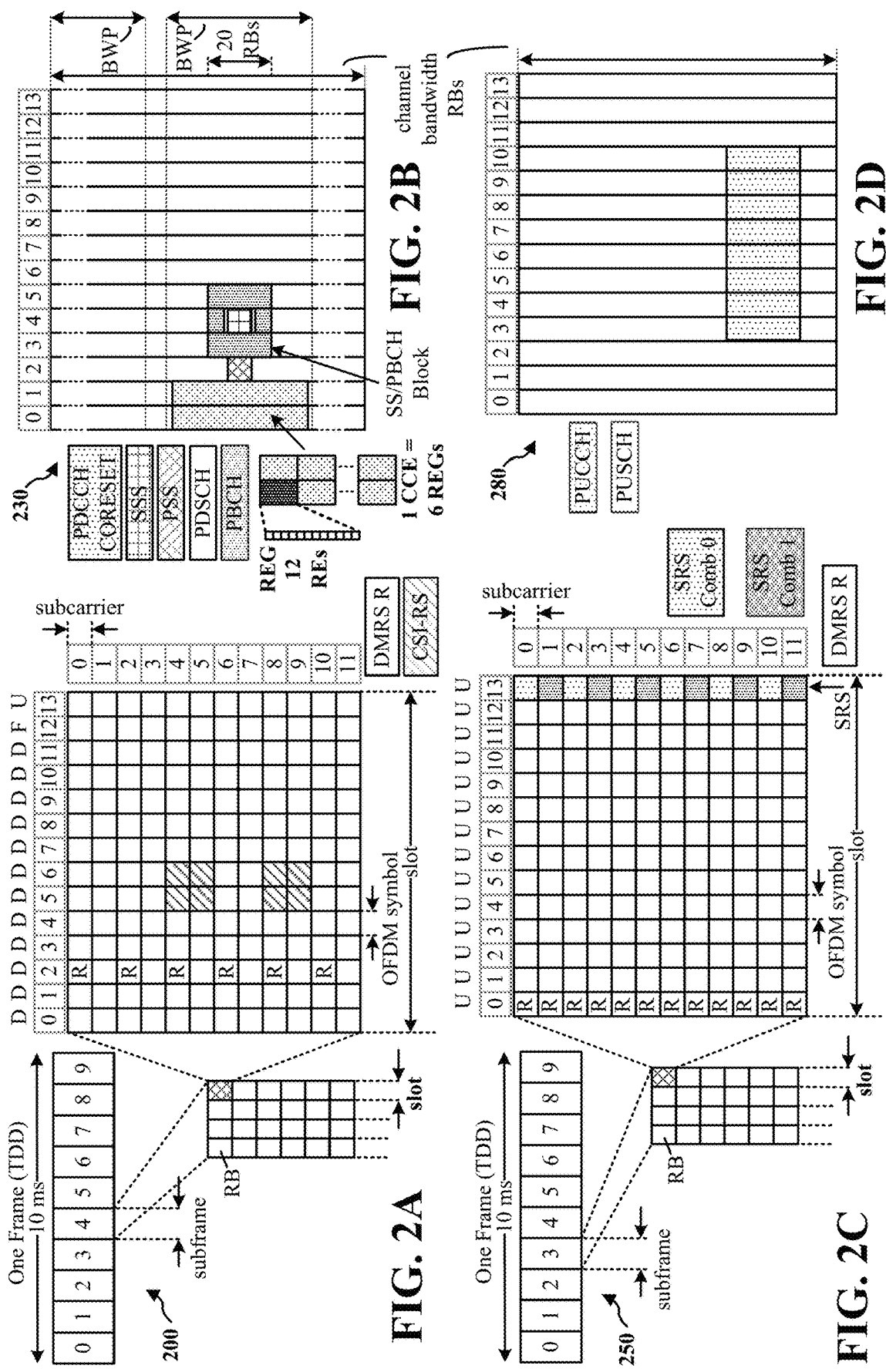
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu *15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
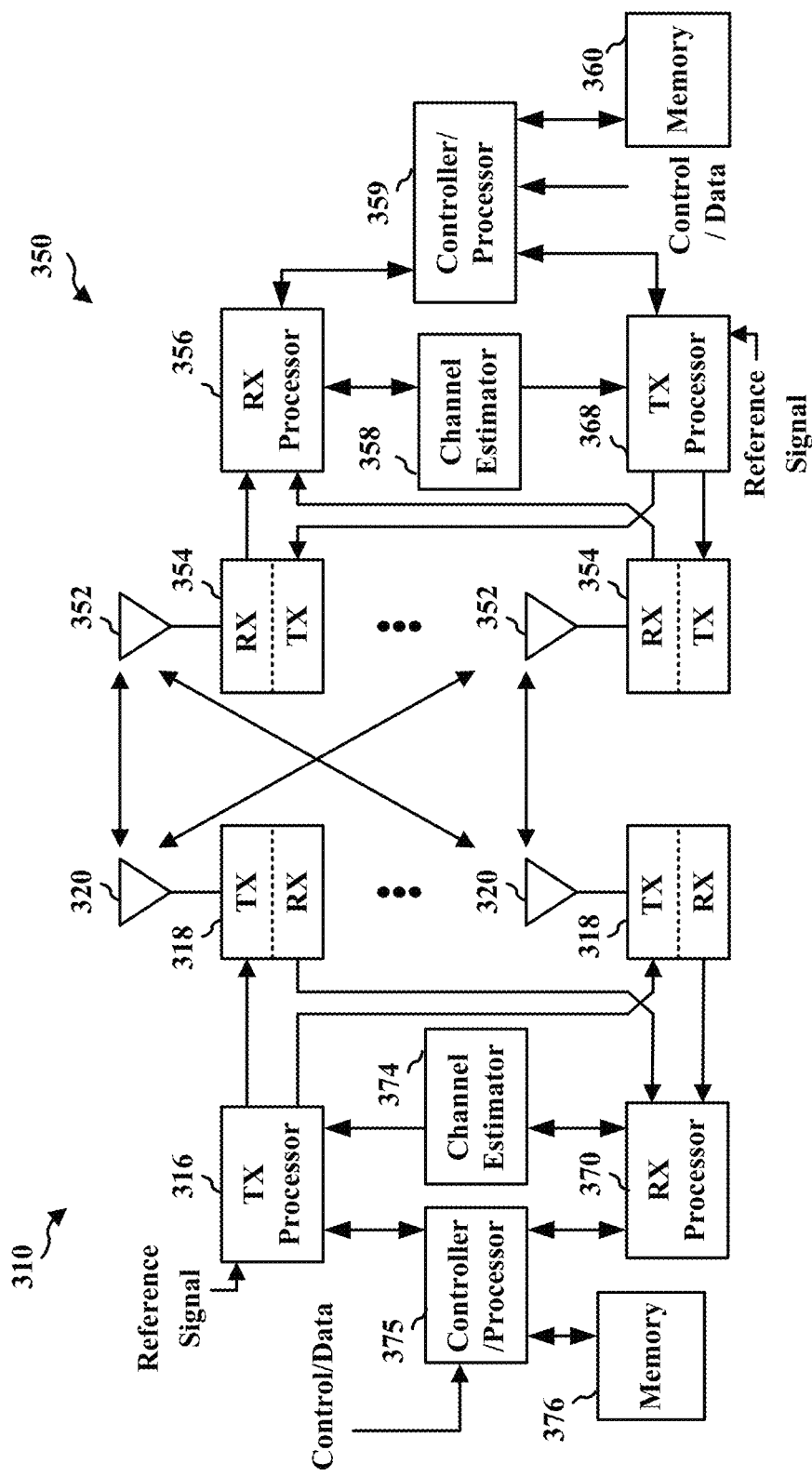
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the beam selection component 198 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and ultra-reliable low latency communication (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
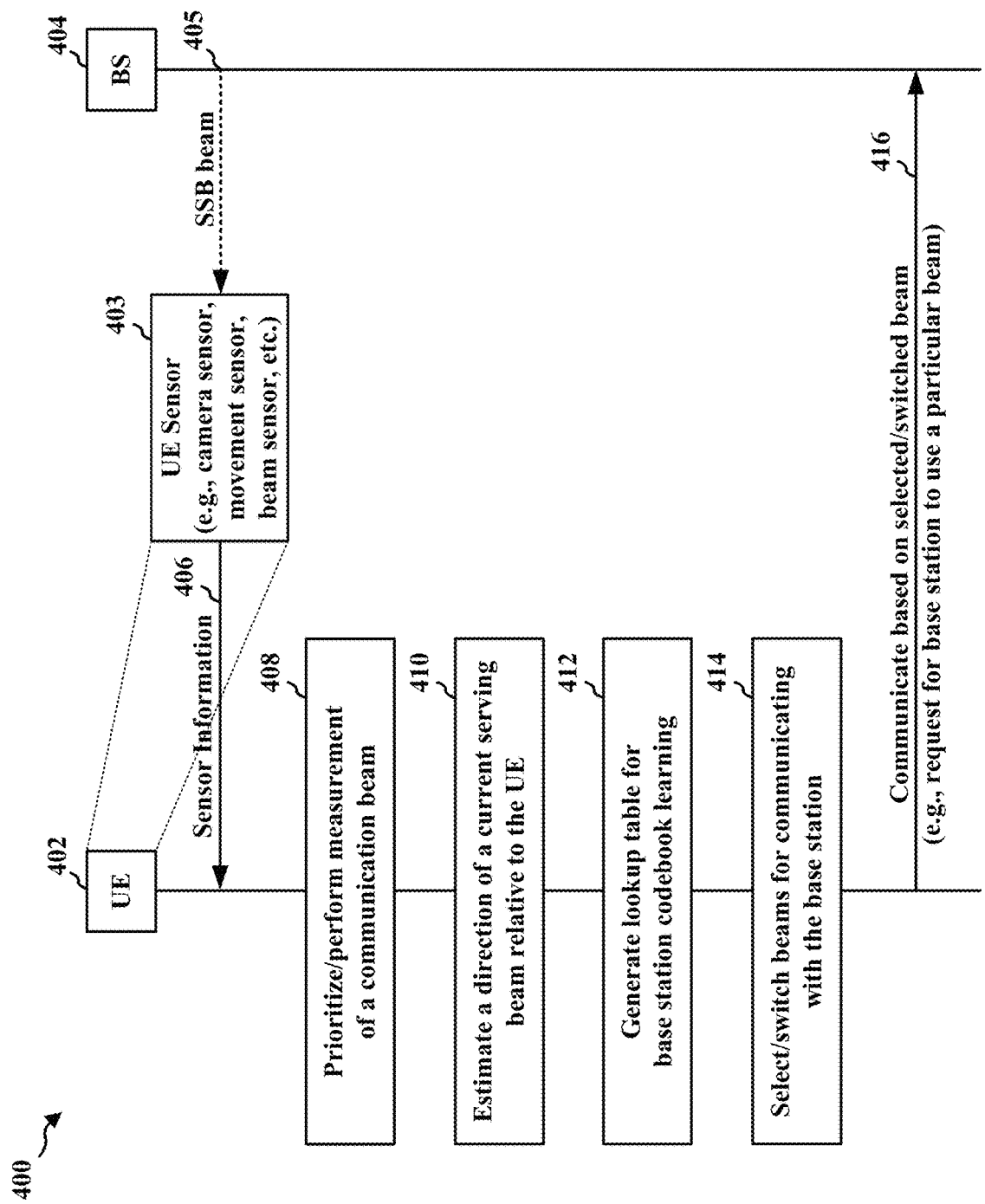
FIG. 4 is a call flow diagram illustrating communications between a UE and a base station.

FIG. 4 is a call flow diagram 400 illustrating communications between a UE 402 and a base station 404. At 406, the UE 402 may receive sensor information from a UE sensor 403. The UE sensor 403 may be a perception sensor, such as a camera sensor, a UE movement sensor etc., or the UE sensor 403 may be a sensor included in a UE communication modem, such as a beam sensor. The camera sensor may generate image frames associated with extended reality (XR) perception techniques. The image frames may be time stamped and used for motion detection of the UE 402. The UE movement sensor may also detect motion of the UE 402 based on degrees of freedom (DoF) information indicative of a translation vector and/or a rotation matrix associated with the UE 402. The beam sensor may be configured to detect an SSB beam received, at 405, from the base station 404. The SSB beam may include information indicative of a particular Tx beam used by the base station 404 to communicate with the UE 402, such that the UE 402 may use sensor information of the UE sensor 403 to learn a base station beam codebook.

At 408, the UE 402 may prioritize and perform a measurement of a communication beam. For example, the UE 402 may prioritize, at 408, the measurement of a communication beam that serves the UE 402. Based on the measurement performed, at 408, the UE 402 may estimate, at 410, a direction of the current serving beam relative to the UE 402. The estimated direction of the current serving beam may be used to adjust/switch a communication beam of the UE 402 used for a BPL with the base station 404.

At 412, the UE 402 may generate a lookup table for base station beam codebook learning. For example, the sensor information received, at 406, from the UE sensor 403 may be indicative of SSB beams used by the base station 404 to communicate with the UE 402. The UE 402 may use the lookup table generated, at 412, to learn the base station beam codebook. The learned base station beam codebook may be used by the UE 402 to adjust/switch a communication beam of the UE 402 for the BPL with the base station 404.

At 414, the UE 402 may select/switch beams for communicating with the base station 404. For example, the UE 402 may select, at 414, a communication beam to be used for the BPL with the base station 404 based on the base station beam codebook learned from the generated lookup table. The UE 402 may also select, at 414, a communication beam to be used for the BPL with the base station 404 based on UE motion compensation techniques (e.g., with or without tracking the base station 404 via the sensor information received, at 406). At 414, the UE 402 may switch beams for communicating with the base station 404 based on the selected beam.

At 416, the UE 402 may communicate with the base station 404 based on the selected/switched beam. For example, the UE 402 may transmit a request for the base station 404 to use a particular beam for future communications with the UE 402. The base station 404 may accept or reject the request from the UE 402, which may or may not be indicated to the UE 402 by a base station response.

Figure 5A:
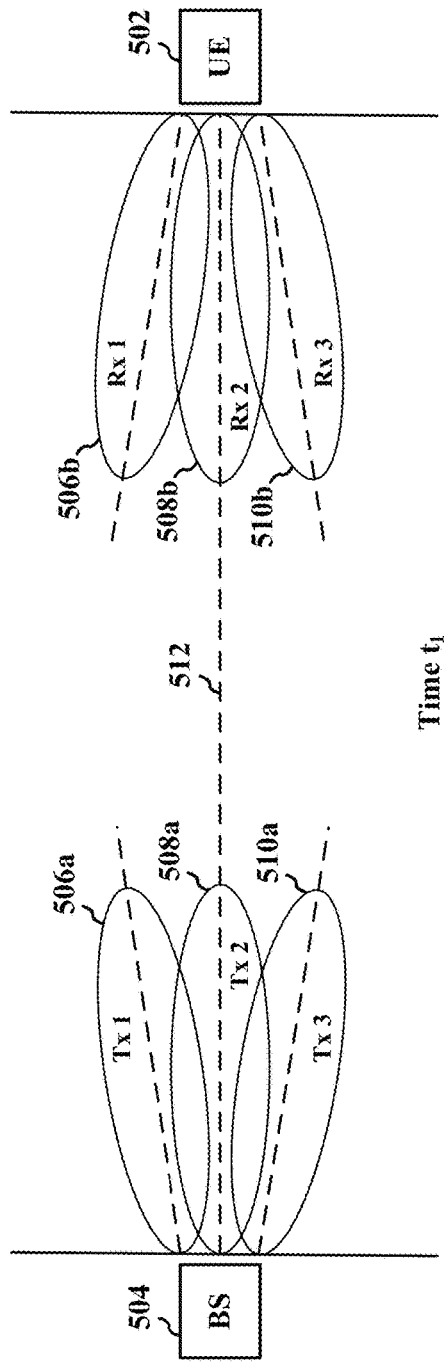
FIGS. 5A-5B illustrate diagrams of transmit (Tx) beams and receive (Rx) beams used for a beam pair link (BPL) between a UE and a base station.
Figure 5B:
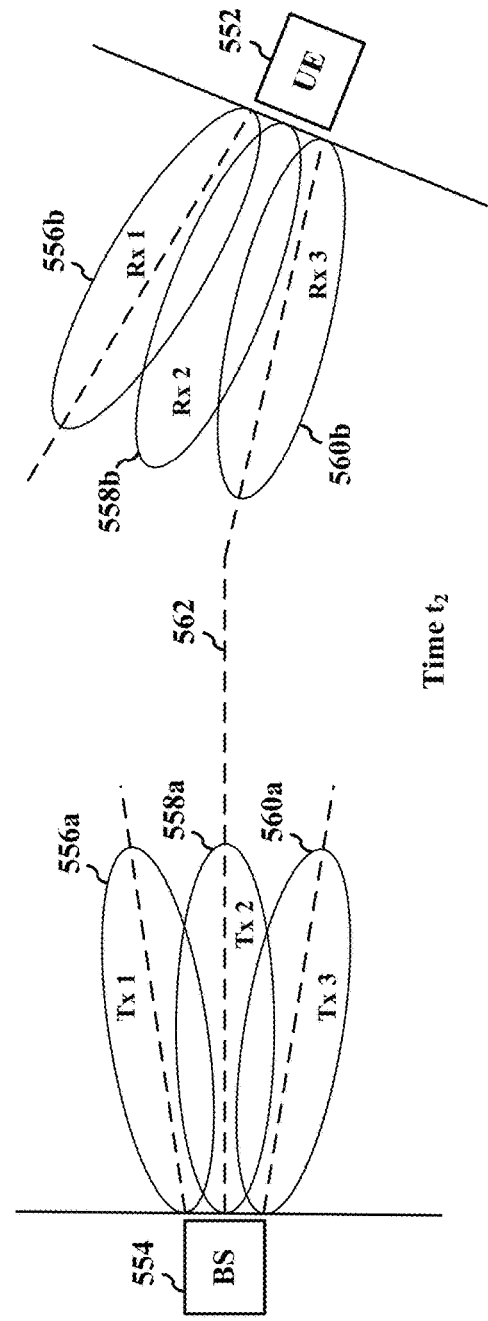

FIGS. 5A-5B illustrate diagrams 500-550 of Tx beams 506a-510a and Rx beams 506b-510b used for a BPL 512/562 between a UE 502/552 and a base station 504/554. In some examples, the UE 502/552 may be associated with an XR application, which may be based on low-latency techniques. For instance, beam management protocols may be executed to implement the XR application in millimeter wave (mmW) operations. The beam management protocols may be used to select a high quality/best beam pair for a beamforming gain of the UE 502/552 and the base station 504/554 at a particular time. Beam management may be implemented in an analog domain with narrow/directive beams at high power for mmW or other high frequencies.

Beam management techniques may be of increased complexity in mmW or other high frequency operations, as the beams associated with the UE 502/552 and the base station 504/554 may be narrow. In the diagrams 500, the UE 502 may have an Rx beam 2 508b that aligns with a Tx beam 2 508a of the base station 504 at a time $t_1$. Beam management may be performed to determine the beam alignment of Rx beam 2 508b with Tx beam 2 508a (e.g., based on a signal strength measurement) to pair the beams for a BPL 512 between the UE 502 and the base station 504. Beam configurations that include multiple sets of beams pointing in different directions may rely on beam measurements to select the Tx beam (e.g., 508a) and the Rx beam (e.g., 508b) that best align for wireless communication based on a highest measured signal strength.

As the frequency of communication for the beams in the beam configuration increases, the beams may become more directive. That is, a width of the beams may be more narrow. Communications based on directive/narrow beams may result in more beams being included in the beam configuration to provide coverage for a same area. Thus, an increased number of beams may be measured to improve performance, but may have high power consumption costs.

An angle between Rx beam 1 506b and Rx beam 3 510b may correspond to the coverage area. While three beams may be used for the coverage area in an initial beam configuration, if the beams are narrowed, e.g., by a half-width, 6 beams may be included in the beam configuration to provide the same coverage area. Using an increased number of beams to provide coverage for the same area may result in performing more beam measurements and a higher overhead for beam management procedures. For example, beam management protocols may be executed to measure an environment and select a beam that corresponds to a highest signal strength. The increased number of beams may result in increased sensitivity to environmental changes of the UE 502 (e.g., sensitivity to UE rotation, UE motion/translation, etc.). Given that directive beams may be narrow, slight rotations/translations of the UE 502 may initiate a beam switching procedure. Narrow/directive beams may also have increased sensitivity to blockages. In mmW communications, signal attenuation may be higher due to the blockages.

Performing beam measurements for each of the increased number of beams may be a time-intensive process in some cases. For example, the UE 502 may not have time to perform an exhaustive search over all of the beams of the UE 502 based on certain low latency time constraints. Thus, searching for an optimal beam to provide a high quality link may cause undue time delays (e.g., particularly in low latency applications, such as XR applications). Performing an exhaustive search for an optimal beam over each of the increased number of beams may include an increased number of beam measurements by the UE 502, which may result in high power consumption in addition to the undue time delays. Aspects presented herein provide for improved beam management techniques, which may improve the efficiency of beam management and may reduce latency for beam adjustments.

In the diagrams 500-550, beam management protocols may be based on an indication of beams to be measured/prioritized. For example, the indication for the beam management protocols may indicate that the 3 beam pairs (e.g., Tx beams 1-3 506a-510a/556a-560a and Rx beams 1-3 506b-510b/556b-560b) illustrated in the diagrams 500-550 are to be measured/prioritized, and that measurements of any remaining beams of the UE 502/552 and the base station 504/554 may be skipped. However, without information indicative of the UE 502/552 and/or the environment (e.g., UE rotation/translation, blockages in the environment, direction of the base station 504/554, etc.), the UE 502/552 may rely on a beam codebook or a previous beam measurement to select a communication beam for the BPL 512/562. In some cases, such techniques for selecting the communication beam may cause time delays and increased power consumption associated with measuring the increased number of beams. Thus, information indicative of the UE 502/552 and/or the environment may improve an efficiency of beam selection procedures, and reduce both latency and power consumption at the UE 502/552.

Sensor information, such as XR perception information, available at an XR device (e.g., a head-mounted display), may be used to learn behaviors of the UE 502/552 and/or the environment. The sensor information may be indicative of a location of a base station 504/554 relative to the UE 502/552, which may improve beam management techniques. In an example, an initial beam pairing, such as Tx beam 2 508a being paired with Rx beam 2 508b, as illustrated in the diagram 500, may be based on the UE 502 performing signal strength measurements on both sides of a beam (e.g., Rx beam 2 508b) that is predicted to be a best beam for communicating with the base station 504. For instance, as illustrated in the diagram 500, at time $t_1$, Tx beam 2 508a and Rx beam 2 508b may be aligned. The UE 502 may measure a signal strength of Rx beam 2 508b (e.g., every 10-20 ms), followed by measuring the signal strength of neighboring beams of Rx beam 2 508b (e.g., Rx beam 3 510b and Rx beam 1 506b).

However, if the UE 552 rotates by a certain angle, as illustrated in the diagram 550, the angle of rotation (e.g., 20 degrees clockwise) may be indicated for beam management procedures to select a different beam. For instance, the UE 552 may select Rx beam 1 556b, which may have a beam direction that is 20 degrees counterclockwise from a beam direction of Rx beam 2 558b. Thus, sensor information, such as XR perception information, may be utilized to indicate changes of the UE 552 and/or the environment (e.g., blockages, UE rotation, direction of the base station 554, etc.), rather than having the UE 552 measure each beam or a subset of beams to determine the changes of the UE 552 and/or the environment. Beam management procedures may be based on compensating for UE motion (e.g., rotation/translation) to select a beam, and base station codebook learning (e.g., to determine where Tx beams 556a-560a of the base station 554 are pointing).

In order to compensate for UE motion, beam management procedures may select a beam (e.g., line-of-sight (LoS) beam) that points in a direction of the base station 554. Some techniques may be based on the UE 552 performing many beam measurements (e.g., one UE beam per SSB every SSB period) for beam management protocols to identify a best beam to use for each SSB. If the UE 552 is rotating fast, the UE 552 may struggle to accurately identify the best beam (e.g., Rx beam 3 560b) via beam measurement techniques, as beam management operations may not receive a priority indication corresponding to a serving beam (e.g., Rx beam 2 558b) to be measured around. However, if a location of the base station 554 is indicated to the UE 552 via XR perception information, beams of the UE 552 may be switched to point toward the base station 554 as the UE 552 rotates. For example, if UE rotation is detected/predicted based on a corresponding direction and magnitude, beam management protocols may prioritize beams that are associated with an opposite direction of the UE rotation to reduce a number of beam measurements as well as select an improved beam. Sensor information, such as XR perception information, may also be used to select a beam without performing beam measurements, which may provide a power savings at the UE 552.

XR perception information at an XR device, such as the UE 502/552, may include timestamped camera frames, 6 DoF information, etc. In an example, two cameras that each provide a 150-degree field of view (FOV) may generate one or more image frames, which may have a resolution of 640 pixels×400 pixels. The images may be 8-bit grey scale image, where each pixel may correspond to a value between [0, 255] at a 30 Hz camera rate. Image frame information may be utilized in addition to timestamp information to determine features of the environment, such as a direction of the base station 504/554 relative to the camera(s) and corresponding frames. Based on the 6 DoF, a location and an orientation of the UE 502/552 may be determined in 3 dimensional (3D) space. The 6 DoF may correspond to movements of the UE 502/552 in a forward direction, backward direction, leftward direction, rightward direction, upward direction, or downward direction. The location of the UE 502/552 may be associated with a translation vector and the orientation of the UE 502/552 may be associated with a rotation matrix. In examples, the 6 DoF may be predicted for a next 100 ms period.

Rotation information available for beam management in 2 dimensional (2D) examples may also be used for 3D examples. A beam in 2D examples may be represented by an azimuth angle (0) and a 1 dimensional beam width (B). In LoS configurations where both the UE 502 and the base station 504 have 3 available communication beams (e.g., 506a-510a/506b-510b), at time $t_1$, the serving beams of the UE 502 and the base station 504 may correspond to (2,2) (i.e., Tx beam 2 508a and Rx beam 2 508b). At time $t_2$, after the UE 552 rotates (e.g., 20 degrees clockwise), the UE serving beam may be switched from Rx beam 2 558b to Rx beam 1 560b, while the base station 554 may maintain Tx beam 2 558a for the BPL 562, at time $t_2$. If the UE 552 is unable to detect UE rotation, the UE 552 may utilize a round-robin technique for cycling through the Rx beams of the UE 552 and performing beam measurements. In such cases, Rx beam 3 560b may be measured last, which may cause a performance degradation until Rx beam 3 560b is measured by the UE 552. Alternatively, if the UE 552 is able to detect that UE rotation has occurred by an angle (a), the UE 552 may prioritize Rx beam 3 560b to be measured first, which may increase performance.

Utilizing sensor information, such as XR perception information, for beam selection and base station codebook learning may allow the UE 502/552 to determine a direction of the base station 504/552 relative to the UE 502/552 and prioritize beams/measurements that are associated with the determined direction of the base station 504/554. For beam selection, the UE 502/552 may select a mmW beam for the UE 502/552 to use or measure based on the sensor information. A first technique may be based on compensating for the movement of the UE 502/552 (e.g., translation/rotation) and utilizing the 6 DoF in association with a serving beam direction to select the beam. If the UE 502/552 begins to rotate, the motion of the UE 502/552 may be compensated with respect to a previous orientation of the UE 502/552. For example, if Tx beam 2 508a and Rx beam 2 508b are initially paired for the BPL 512, the UE 502 may compensate for the UE rotation to select a different Rx beam.

A second technique may be based on estimating a direction of the base station 504/554 relative to the UE 502/552 and utilizing both the 6 DoF and the camera frames. If the base station 504/554 is in a LoS of the UE 502/552, a location of the base station 504/554 may be determined based on the XR perception information. For example, the UE 502/552 may perform object detection techniques on the camera frames to determine the location/direction of the base station 504/554 relative to the UE 502/552. If the UE 502/552 accurately determines the direction of the base station 504/554, the UE 502/552 may select an Rx beam that points toward the base station 504/554.

Based on a beam codebook, the UE 502/552 may determine $\phi_{serve}$ and $\theta_{serve}$, which may respectively correspond to an elevation angle and an azimuth angle of a current serving beam. The UE 502/552 may convert the current beam direction into rectangular coordinates, which may be indicated via $1_{serve}^{beam}$, and perform a conversion from a beam coordinate system to a 6 DoF coordinate system, which may be indicated via $1_{serve}^{6Dof}$, based on one or more XR transformations. Using the 6 DoF, a rotation matrix and a translation vector indicated via (R|t) may be determined/tracked based on $1_{track}^{6Dof}=(R|t)*1_{serve}^{6Dof}$, such that the UE 502/552 may convert the coordinates back to elevation and azimuth values that respectively correspond to $\phi_{new}$, and $\theta_{new}$. If $\phi_{new}$ and $\theta_{new}$ exceed a $\phi$ value or a $\theta$ value of another beam in the UE beam codebook, the UE 502/552 may switch to that beam. Such techniques may provide a lower latency. Based on predicted movements of the UE 552 and a reduced search space size that may allow a beam to be selected more quickly, beam management protocols may be executed proactively to prepare/indicate a beam (e.g., Rx beam 3 560b) for the UE 552 to use once motion begins, which may reduce both a block error rate (BLER) and a number of retransmissions. Power consumption may also be reduced at the UE 552 by indicating the beams to be measured, which may save the UE 552 from unnecessarily measuring some of the UE beams.

For base station beam codebook learning procedures, a first technique may be based on a lookup table and may use both the 6 DoF information and the camera frames, whereas a second technique may be based on an online non-linear optimization procedure that may also use both the 6 DoF information and the camera frames. In order to track a direction of the base station 504/554 relative to the UE 502/552, the UE 502/552 may determine a 3D location (Loc$^i$) of the base station 504/554 based on a camera frame i, calculate elevation and azimuth angles ($\phi_{gNB}$, $\theta_{gNB}$) of the base station 504/554 associated with the 3D location (Loc$^i$) of the base station 504/554, transform the elevation and azimuth angles ($\phi_{gNB}$, $\theta_{gNB}$) of the base station 504/554 to respective beam coordinate system values ($\phi_{gNB}$, $\theta_{gNB}$), and select a UE beam from the UE beam codebook having elevation and azimuth values ($\phi$, $\theta$) that are closest to the beam coordinate system values ($\phi'_{gNB}$, $\theta'_{gNB}$). Beam codebook learning techniques may reduce latency based on predetermined beams to be used for particular communications. Power consumption at the UE 502/552 may also be reduced based on a reduced number of SSBs being unnecessarily measured.

The UE 502/552 may be configured to determine an SSB identifier (ID) corresponding to the base station 504/554. For example, for each SSB period, the UE 502/552 may measure all of the SSBs received from the bae station 504/554 in order to determine which SSB is associated with the highest signal strength. The UE 502/552 may report the UE measurements to the base station 504/554 in case an SSB switch is to be performed at the base station 504/554. However, if the UE 502/552 had learned the base station codebook (e.g., directions that each SSB is pointing in 3D space and corresponding beam widths), the UE 502/552 may perform a reduced number of beam measurements based on SSBs that point in directions toward a location of the UE 502/552 in 3D space (e.g., at least in LoS scenarios). The UE 502/552 may also indicate to the base station 504/554 the beams/SSBs that the UE 502/552 may use or may be predicted to use in the near future (e.g., next 100 ms). Accordingly, base station codebook learning techniques may be based on tracking a 3D location of the base station 504/554 relative to the UE 502/552.

Localizing the base station 504/554 via detection and tracking techniques may include assuming that, in an initial camera frame, a bounding box is generated around the base station 504/554 in association with camera sensing (e.g., camera sensing associated with a first/left camera frame and a second/right camera frame). Based on the sensing information, the base station 504/554 may be located in 3D space using triangulation techniques (e.g., a left location output may correspond to $Loc_0^{left}=[x, y, z]$). Using the 6 DoF $(R|t)_0$, the UE 502/552 may compute a real-world location of the base station 504/554 based on $Loc_0^{world}=(R|t)_0*Loc_0^{left}$. For each subsequent camera frame i, the UE 502/552 may determine $Loc_i^{left}=(R|t)_i^{-1}*Loc_0^{world}$. A camera algorithm may be configured to project the 3D location of the base station 504/554 to a pixel location in a left camera frame (e.g., using a left pixel output and a right location output via $p_i^{left}$. (c)$Loc_i^{right}=(R|t)_{l>r}*Loc_i^{left}$). The camera algorithm may also be configured to project the 3D location of the base station 504/554 to a pixel location in a right camera frame (e.g., based on a right pixel output corresponding to $p_i^{right}$). A left location and a right location ($Loc_i^{left}$, $Loc_i^{right}$) may be stored at the UE 502/552 for tracking the location of the base station 504/554. A left pixel output and a right pixel output ($p_i^{left}$, $p_i^{right}$) may also be stored at the UE 552/552 for tracking a base station bounding box tracking (e.g., if the location of the base station 504/554 is outside the FOV of the camera sensors).

An object detector may be configured to detect the base station 504/554 in the initial camera frame based on a scan of the environment (e.g., initial/one-time scan) and using a quick response (QR) code associated with the base station 504/554 to determine the 3D location of the base station 504/554. Based on NR positioning techniques, the base station 504/554 may also locate the UE 502/552 and communicate the 3D location of the base station 504/554 to the UE 502/552. Further, the UE 502/552 may estimate the location of the base station 504/554 based on an approximate beam direction. Triangulation techniques may be performed based on an intersection of at least two direction lines in 3D space. Thus, the UE 502/552 may execute an algorithm for object detection associated with the camera frames to detect the location of the base station 504/554, and after the location of the base station 504/554 is determined, UE sensors may be used to track the location/orientation of the base station 504/554 as the UE 502/552 moves within the environment.

Information associated with the base station 504/554 may be used to learn the base station codebook. A first technique may be based on a lookup table. For example, the UE 502/552 may have determined that, at a particular location/orientation of the UE 502/552, the base station 504/554 utilized Tx beam 2 508a/558a, which may be saved/stored to the codebook. Accordingly, each time the UE 502/552 identifies the particular location/orientation, the UE 502/552 may determine that Tx beam 2 508a/558a of the base station 504/554 may be the most probable beam the base station 504/554 may use for communication with the UE 502/552.

The lookup table may be built based on the UE location/orientation in 3D space (e.g., based on the 6 DoF), the location of the base station 504/554 (e.g., based on base station tracking), a UE beam ID and direction corresponding to a UE beam codebook, and/or a base station SSB beam ID. The 3D space may be allocated into subsets of directions associated with the elevation and azimuth values, where each subset may indicate a direction that a particular SSB is pointing (e.g., SSB azimuth, elevation, and beam width). The lookup table may be built based on UE beam measurements that the UE 502/552 collects as the UE 502/552 moves about the environment.

A second technique may be based on non-linear optimization. For example, the second technique may be implemented in cases where a large size of the lookup table may make the lookup table impractical. A non-linear model may be implemented to predict an RSRP associated with both determined parameters and undetermined parameters to be estimated. The determined parameters may include the UE location/orientation in 3D space (e.g., based on the 6 DoF), the base station location (e.g., based on base station tracking), the UE beam ID and direction corresponding to the UE beam codebook, and/or the base station SSB beam ID. The undetermined parameters may include the base station SSB beam direction (e.g., SSB azimuth, elevation, and beam width). The RSRP may be determined based on RSRP=$f$ (gNB$_{loc}$, gNB$_{ori}$, SSB$_{ID}$, $\Phi_{SSB}$, $\Theta_{SSB}$, UE$_{loc}$, UE$_{ori}$, UE_beam$_{id}$, $\Phi_{UE}$, $\Theta_{UE}$) for a non-linear function $f( )$. Learning the non-linear function $f( )$ may be based on optimization techniques, such as a Levenberg-Marquardt algorithm.

Figure 6:
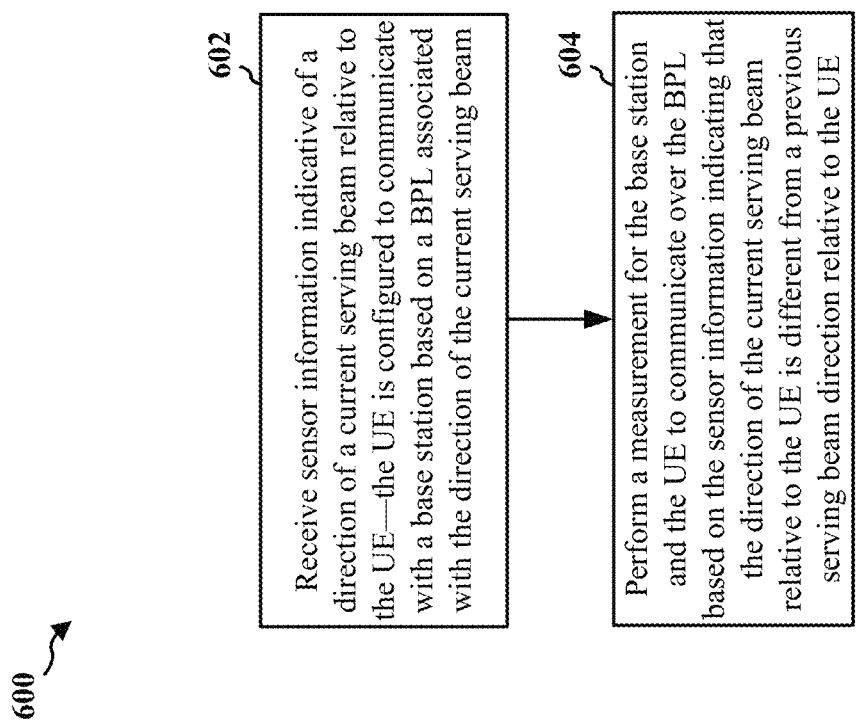
FIG. 6 is a flowchart of a method of wireless communication at a UE.

FIG. 6 is a flowchart 600 of a method of wireless communication. The method may be performed by a UE (e.g., the UE 104, 402, 502, 552; the apparatus 902; etc.), which may include the memory 360 and which may be the entire UE 104, 402, 502, 552 or a component of the UE 104, 402, 502, 552, such as the TX processor 368, the RX processor 356, and/or the controller/processor 359. The method may provide for improved beam selection techniques based on reduced latency and power consumption.

At 602, the UE may receive sensor information indicative of a direction of a current serving beam relative to the UE—the UE is configured to communicate with a base station based on a BPL associated with the direction of the current serving beam. For example, referring to FIGS. 4-5, the UE 402 may receive, at 406, sensor information from the UE sensor 403 indicative of a current serving beam direction from the base station 404. In the diagrams 500-550, the current serving beam may correspond to Tx beam 2 508a-558a of the base station 504/554. In examples, the sensor information received, at 406, from the UE sensor 403 may correspond to XR perception information. The reception, at 602, may be performed by the reception component 930 of the apparatus 902 in FIG. 9.

At 604, the UE may perform a measurement for the base station and the UE to communicate over the BPL based on the sensor information indicating that the direction of the current serving beam relative to the UE is different from a previous serving beam direction relative to the UE. For example, referring to FIGS. 4-5, the UE 402/552 may perform, at 408, a measurement of a communication beam (e.g., Rx beam 3 560b) based on sensor information received, at 406, from the UE sensor 403, which may indicate that a direction of the current serving beam (e.g., Tx beam 2 558a) has changed relative to the UE 402/552. The UE 552 may communicate with the base station 554 over the BPL 562 via Rx beam 3 560b. The performing, at 604, may be performed by the performance component 942 of the apparatus 902 in FIG. 9.

Figure 7:
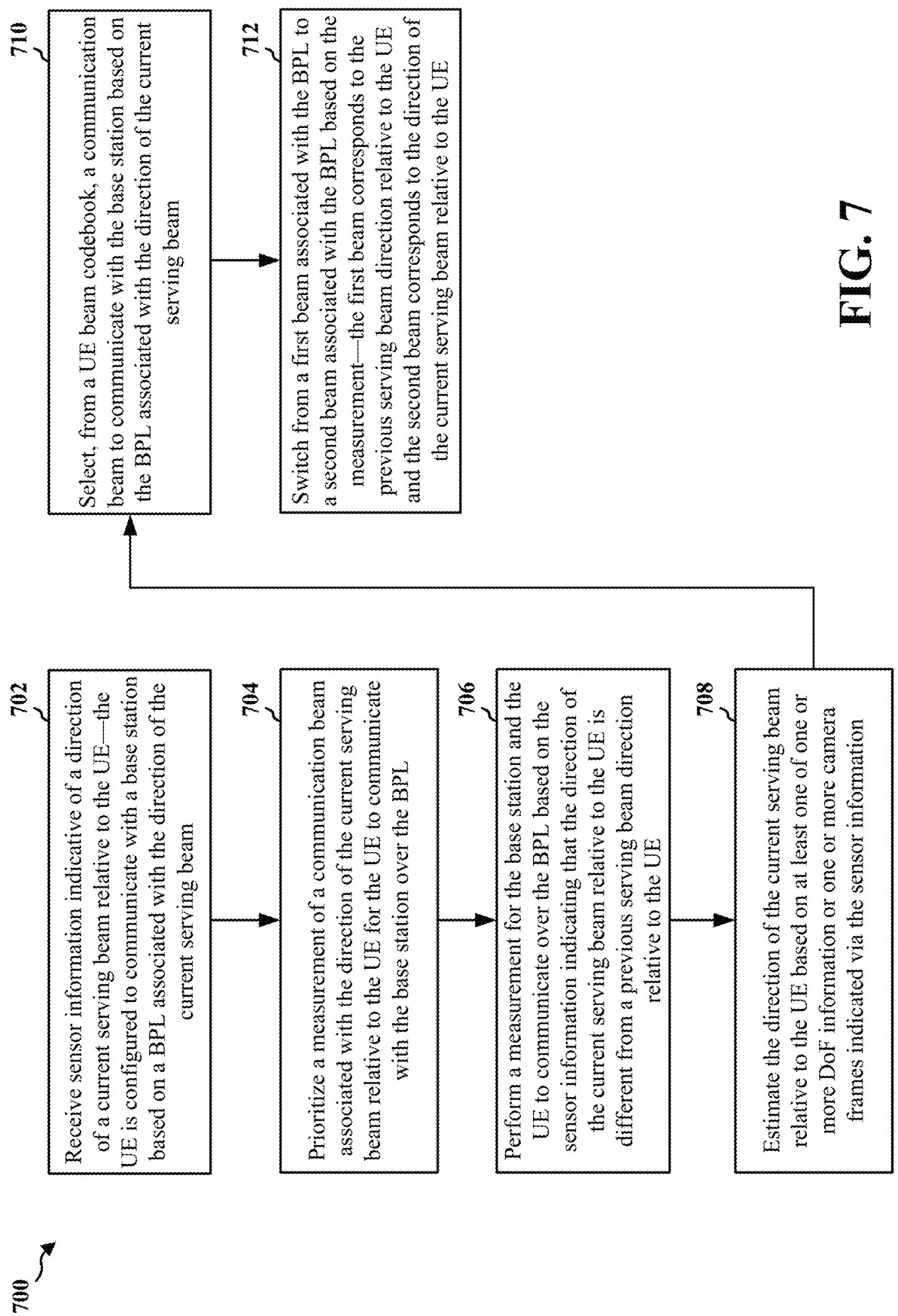
FIG. 7 is a flowchart of a method of wireless communication at a UE.

FIG. 7 is a flowchart 700 of a method of wireless communication. The method may be performed by a UE (e.g., the UE 104, 402, 502, 552; the apparatus 902; etc.), which may include the memory 360 and which may be the entire UE 104, 402, 502, 552 or a component of the UE 104, 402, 502, 552, such as the TX processor 368, the RX processor 356, and/or the controller/processor 359. The method may provide for improved beam selection techniques based on reduced latency and power consumption.

At 702, the UE may receive sensor information indicative of a direction of a current serving beam relative to the UE—the UE is configured to communicate with a base station based on a BPL associated with the direction of the current serving beam. For example, referring to FIGS. 4-5, the UE 402 may receive, at 406, sensor information from the UE sensor 403 indicative of a current serving beam direction from the base station 404. In the diagrams 500-550, the current serving beam may correspond to Tx beam 2 508a-558a of the base station 504/554. In examples, the sensor information received, at 406, from the UE sensor 403 may correspond to XR perception information. The reception, at 702, may be performed by the reception component 930 of the apparatus 902 in FIG. 9.

At 704, the UE may prioritize a measurement of a communication beam associated with the direction of the current serving beam relative to the UE for the UE to communicate with the base station over the BPL. For example, referring to FIGS. 4-5, the UE 402/552 may prioritize, at 408, a measurement of a communication beam (e.g., the UE 552 may prioritize a measurement of Rx beam 3 560b) for the UE 402/552 to communicate (e.g., at 416) with the base station 404/554. The prioritizing, at 704, may be performed by the prioritization component 940 of the apparatus 902 in FIG. 9.

At 706, the UE may perform a measurement for the base station and the UE to communicate over the BPL based on the sensor information indicating that the direction of the current serving beam relative to the UE is different from a previous serving beam direction relative to the UE. For example, referring to FIGS. 4-5, the UE 402/552 may perform, at 408, a measurement of a communication beam (e.g., Rx beam 3 560b) based on sensor information received, at 406, from the UE sensor 403, which may indicate that a direction of the current serving beam (e.g., Tx beam 2 558a) has changed relative to the UE 402/552. The UE 552 may communicate with the base station 554 over the BPL 562 via Rx beam 3 560b. The performing, at 706, may be performed by the performance component 942 of the apparatus 902 in FIG. 9.

At 708, the UE may estimate the direction of the current serving beam relative to the UE based on at least one of one or more DoF information or one or more camera frames indicated via the sensor information. For example, referring to FIG. 4, the UE 402 may estimate, at 410, a direction of a current serving beam relative to the UE 402 based on the sensor information received, at 406, from the UE sensor 403. The estimating, at 708, may be performed by the estimation component 944 of the apparatus 902 in FIG. 9.

At 710, the UE may select, from a UE beam codebook, a communication beam to communicate with the base station based on the BPL associated with the direction of the current serving beam. For example, referring to FIGS. 4-5, the UE 402/552 may select, at 414, a beam (e.g., Rx beam 3 560b) for communicating with the base station 404/554 over the BPL 562. The communication beam (e.g., Rx beam 3 560b) may be selected, at 414, from the UE beam codebook based on at least one of predicted movement of the UE 402/552 or a beam search space associated with a subset of UE beams (e.g., Rx beams 1-3 556b-560b). The selecting, at 714, may be performed by the selection component 950 of the apparatus 902 in FIG. 9.

At 712, the UE may switch from a first beam associated with the BPL to a second beam associated with the BPL based on the measurement—the first beam corresponds to the previous serving beam direction relative to the UE and the second beam corresponds to the direction of the current serving beam relative to the UE. For example, referring to FIGS. 4-5, the UE 402/502/552 may switch beams, at 414 (e.g., from Rx beam 2 508b/558b to Rx beam 3 510b/560b) for communicating with the base station 404/554 over BPL 562, which may be based on the measurement performed, at 408. The communication associated with the beam switching, at 414, may include a request transmitted, at 416, to receive a particular communication beam from the base station 404 for communicating with the base station 404 based on the BPL associated with the direction of the current serving beam. The first beam (e.g., Rx beam 2 508b/558b) may be switched, at 414, to the second beam (e.g., Rx beam 3 510b/560b) based on one or more DoF information including at least one of rotation information of the UE 402/502/552 or translation information of the UE 402/502/552 indicated via the sensor information received, at 406, from the UE sensor 403. The switching, at 716, may be performed by the switcher component 952 of the apparatus 902 in FIG. 9.

Figure 8:
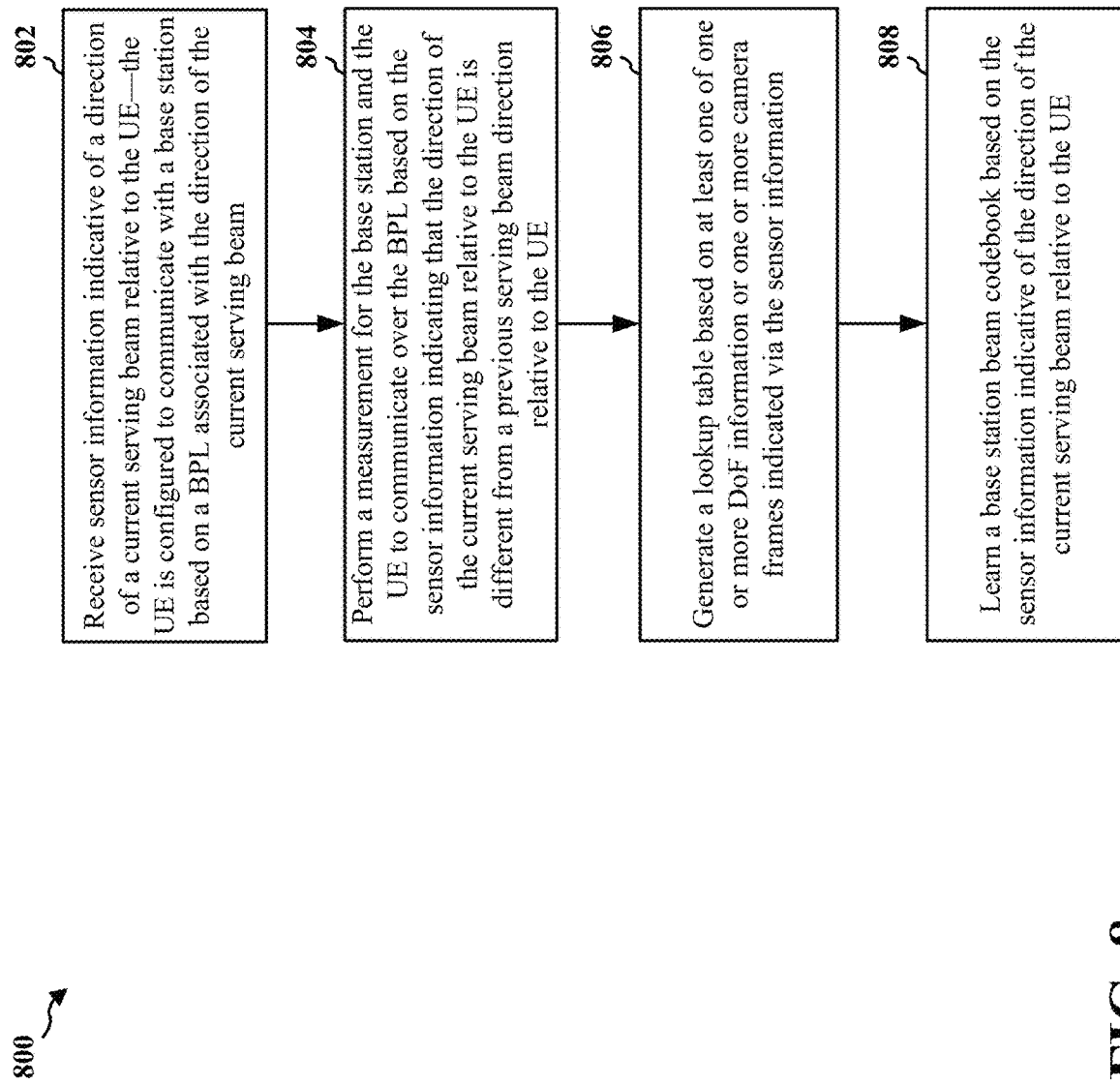
FIG. 8 is a flowchart of a method of wireless communication at a UE.

FIG. 8 is a flowchart 800 of a method of wireless communication. The method may be performed by a UE (e.g., the UE 104, 402, 502, 552; the apparatus 902; etc.), which may include the memory 360 and which may be the entire UE 104, 402, 502, 552 or a component of the UE 104, 402, 502, 552, such as the TX processor 368, the RX processor 356, and/or the controller/processor 359. The method may provide for improved beam selection techniques based on reduced latency and power consumption.

At 802, the UE may receive sensor information indicative of a direction of a current serving beam relative to the UE—the UE is configured to communicate with a base station based on a BPL associated with the direction of the current serving beam. For example, referring to FIGS. 4-5, the UE 402 may receive, at 406, sensor information from the UE sensor 403 indicative of a current serving beam direction from the base station 404. In the diagrams 500-550, the current serving beam may correspond to Tx beam 2 508a-558a of the base station 504/554. In examples, the sensor information received, at 406, from the UE sensor 403 may correspond to XR perception information. The reception, at 802, may be performed by the reception component 930 of the apparatus 902 in FIG. 9.

At 804, the UE may perform a measurement for the base station and the UE to communicate over the BPL based on the sensor information indicating that the direction of the current serving beam relative to the UE is different from a previous serving beam direction relative to the UE. For example, referring to FIGS. 4-5, the UE 402/552 may perform, at 408, a measurement of a communication beam (e.g., Rx beam 3 560b) based on sensor information received, at 406, from the UE sensor 403, which may indicate that a direction of the current serving beam (e.g., Tx beam 2 558a) has changed relative to the UE 402/552. The UE 552 may communicate with the base station 554 over the BPL 562 via Rx beam 3 560b. The performing, at 804, may be performed by the performance component 942 of the apparatus 902 in FIG. 9.

At 806, the UE may generate a lookup table based on at least one of one or more DoF information or one or more camera frames indicated via the sensor information. For example, referring to FIG. 4, the UE 402 may generate, at 412, a lookup table for base station codebook learning based on the sensor information received, at 406, from the UE sensor 403. The generating, at 806, may be performed by the generation component 946 of the apparatus 902 in FIG. 9.

At 808, the UE may learn a base station beam codebook based on the sensor information indicative of the direction of the current serving beam relative to the UE. For example, referring to FIG. 4, the UE 402 may learn a base station beam codebook via the lookup table generated, at 412, based on the sensor information received, at 406, from the UE sensor 403. The base station beam codebook may be learned by the UE 402 based on a non-linear function indicative of an RSRP associated with one or more parameters. The non-linear function indicative of the RSRP may be based on at least one of one or more DoF information or one or more camera frames indicated via the sensor information received, at 406, from the UE sensor 403. The one or more parameters associated with the non-linear function may include at least one of UE location, UE orientation, base station location, UE beam ID, UE beam direction, base station SSB beam ID, or base station SSB beam direction. The learning, at 808, may be performed by the learning component 948 of the apparatus 902 in FIG. 9.

Figure 9:
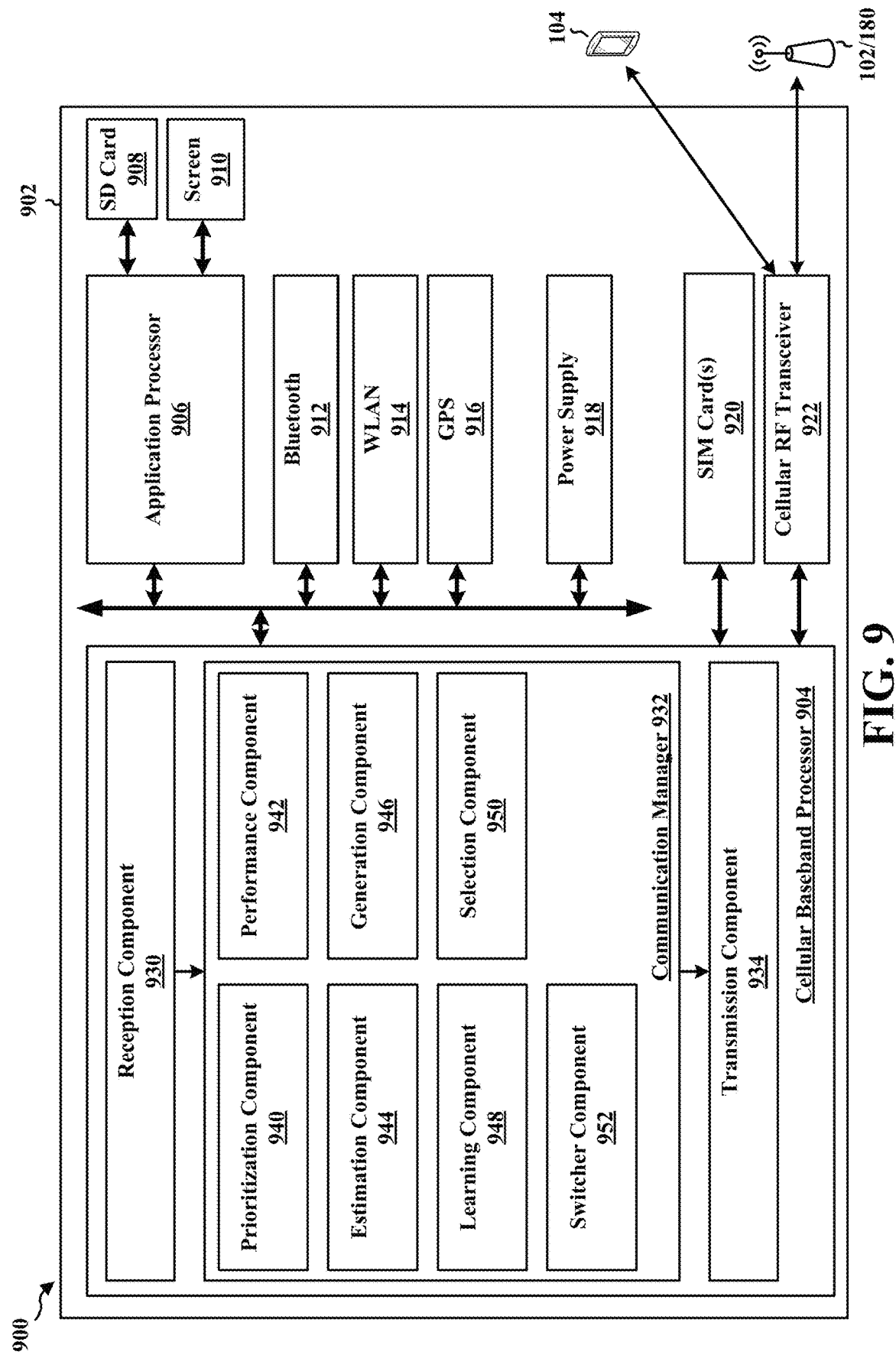
FIG. 9 is a diagram illustrating an example of a hardware implementation for an example apparatus.

FIG. 9 is a diagram 900 illustrating an example of a hardware implementation for an apparatus 902. The apparatus 902 may be a UE, a component of a UE, or may implement UE functionality. In some aspects, the apparatus 902 may include a cellular baseband processor 904 (also referred to as a modem) coupled to a cellular RF transceiver 922. In some aspects, the apparatus 902 may further include one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, or a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the additional modules of the apparatus 902.

The communication manager 932 includes a prioritization component 940 that is configured, e.g., as described in connection with 704, to prioritize a measurement of a communication beam associated with the direction of the current serving beam relative to the UE for the UE to communicate with the base station over the BPL. The communication manager 932 further includes a performance component 942 that is configured, e.g., as described in connection with 604, 706, and 804, to perform a measurement for the base station and the UE to communicate over the BPL based on the sensor information indicating that the direction of the current serving beam relative to the UE is different from a previous serving beam direction relative to the UE. The communication manager 932 further includes an estimation component 944 that is configured, e.g., as described in connection with 708, to estimate the direction of the current serving beam relative to the UE based on at least one of one or more DoF information or one or more camera frames indicated via the sensor information. The communication manager 932 further includes a generation component 946 that is configured, e.g., as described in connection with 806, to generate a lookup table based on at least one of one or more DoF information or one or more camera frames indicated via the sensor information. The communication manager 932 further includes a learning component 948 that is configured, e.g., as described in connection with 808, to learn a base station beam codebook based on the sensor information indicative of the direction of the current serving beam relative to the UE. The communication manager 932 further includes a selection component 950 that is configured, e.g., as described in connection with 710, to select, from a UE beam codebook, a communication beam to communicate with the base station based on the BPL associated with the direction of the current serving beam. The communication manager 932 further includes a switcher component 952 that is configured, e.g., as described in connection with 712, to switch from a first beam associated with the BPL to a second beam associated with the BPL based on the measurement—the first beam corresponds to the previous serving beam direction relative to the UE and the second beam corresponds to the direction of the current serving beam relative to the UE.

The reception component 930 is configured, e.g., as described in connection with 602, 702, and 802, to receive sensor information indicative of a direction of a current serving beam relative to the UE—the UE is configured to communicate with a base station based on a BPL associated with the direction of the current serving beam. The transmission component is configured, e.g., to transmit a request to receive a particular communication beam from the base station for communicating with the base station based on the BPL associated with the direction of the current serving beam.

The apparatus may include additional components that perform each of the blocks of the algorithm in the flowcharts of FIGS. 6-8. As such, each block in the flowcharts of FIGS. 6-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 902 may include a variety of components configured for various functions. In one configuration, the apparatus 902, and in particular the cellular baseband processor 904, includes means for receiving sensor information indicative of a direction of a current serving beam relative to the UE, the UE configured to communicate with a base station based on a BPL associated with the direction of the current serving beam; and means for performing a measurement for the base station and the UE to communicate over the BPL based on the sensor information indicating that the direction of the current serving beam relative to the UE is different from a previous serving beam direction relative to the UE. The apparatus 902 further includes means for switching from a first beam associated with the BPL to a second beam associated with the BPL based on the measurement, the first beam corresponding to the previous serving beam direction relative to the UE, the second beam corresponding to the direction of the current serving beam relative to the UE. The apparatus 902 further includes means for estimating the direction of the current serving beam relative to the UE based on at least one of one or more DoF information or one or more camera frames indicated via the sensor information, the first beam being switched to the second beam based on the estimation. The apparatus 902 further includes means for prioritizing the measurement of a communication beam associated with the direction of the current serving beam relative to the UE for the UE to communicate with the base station over the BPL. The apparatus 902 further includes means for selecting, from a UE beam codebook, a communication beam to communicate with the base station based on the BPL associated with the direction of the current serving beam.

In a further configuration, the apparatus 902, and in particular the cellular baseband processor 904, includes means for receiving sensor information indicative of a direction of a current serving beam relative to the UE, the UE configured to communicate with a base station based on a BPL associated with the direction of the current serving beam; and means for performing a measurement for the base station and the UE to communicate over the BPL based on the sensor information indicating that the direction of the current serving beam relative to the UE is different from a previous serving beam direction relative to the UE. The apparatus 902 further includes means for learning a base station beam codebook based on the sensor information indicative of the direction of the current serving beam relative to the UE. The apparatus 902 further includes means for generating a lookup table based on at least one of one or more DoF information or one or more camera frames indicated via the sensor information, the lookup table generated to learn the base station beam codebook. The apparatus 902 further includes means for transmitting a request to receive a particular communication beam from the base station for communicating with the base station based on the BPL associated with the direction of the current serving beam.

The means may be one or more of the components of the apparatus 902 configured to perform the functions recited by the means. As described supra, the apparatus 902 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to receive sensor information indicative of a direction of a current serving beam relative to the UE, the UE configured to communicate with a base station based on a BPL associated with the direction of the current serving beam; and perform a measurement for the base station and the UE to communicate over the BPL based on the sensor information indicating that the direction of the current serving beam relative to the UE is different from a previous serving beam direction relative to the UE.

Aspect 2 may be combined with aspect 1 and includes that the sensor information corresponds to XR perception information.

Aspect 3 may be combined with any of aspects 1-2 and includes that the at least one processor is further configured to switch from a first beam associated with the BPL to a second beam associated with the BPL based on the measurement, the first beam corresponding to the previous serving beam direction relative to the UE, the second beam corresponding to the direction of the current serving beam relative to the UE.

Aspect 4 may be combined with any of aspects 1-3 and includes that the first beam is switched to the second beam based on one or more DoF information including at least one of rotation information of the UE or translation information of the UE indicated via the sensor information.

Aspect 5 may be combined with any of aspects 1-4 and includes that the at least one processor is further configured to estimate the direction of the current serving beam relative to the UE based on at least one of one or more DoF information or one or more camera frames indicated via the sensor information, the first beam being switched to the second beam based on the estimation.

Aspect 6 may be combined with any of aspects 1-5 and includes that the at least one processor is further configured to prioritize the measurement of a communication beam associated with the direction of the current serving beam relative to the UE for the UE to communicate with the base station over the BPL.

Aspect 7 may be combined with any of aspects 1-6 and includes that the at least one processor is further configured to select, from a UE beam codebook, a communication beam to communicate with the base station based on the BPL associated with the direction of the current serving beam.

Aspect 8 may be combined with any of aspects 1-7 and includes that the communication beam is selected from the UE beam codebook based on at least one of predicted movement of the UE or a beam search space associated with a subset of UE beams.

Aspect 9 may be combined with any of aspects 1-8 and includes that the at least one processor is further configured to learn a base station beam codebook based on the sensor information indicative of the direction of the current serving beam relative to the UE.

Aspect 10 may be combined with any of aspects 1-9 and includes that the at least one processor is further configured to generate a lookup table based on at least one of one or more DoF information or one or more camera frames indicated via the sensor information, the lookup table generated to learn the base station beam codebook.

Aspect 11 may be combined with any of aspects 1-10 and includes that the base station beam codebook is learned based on a non-linear function indicative of a RSRP associated with one or more parameters.

Aspect 12 may be combined with any of aspects 1-11 and includes that the non-linear function indicative of the RSRP is based on at least one of one or more DoF information or one or more camera frames indicated via the sensor information.

Aspect 13 may be combined with any of aspects 1-12 and includes that the one or more parameters associated with the non-linear function include at least one of UE location, UE orientation, base station location, UE beam ID, UE beam direction, base station SSB beam ID, or base station SSB beam direction.

Aspect 14 may be combined with any of aspects 1-13 and includes that the at least one processor is further configured to transmit a request to receive a particular communication beam from the base station for communicating with the base station based on the BPL associated with the direction of the current serving beam.

Aspect 15 may be combined with any of aspects 1-14 and further includes at least one of an antenna or a transceiver coupled to the at least one processor.

Aspect 16 is a method of wireless communication for implementing any of aspects 1-15.

Aspect 17 is an apparatus for wireless communication including means for implementing any of aspects 1-15.

Aspect 18 is a computer-readable medium storing computer executable code, the code when executed by at least one processor causes the at least one processor to implement any of aspects 1-15.

What is claimed is:

1. An apparatus for wireless communication at a user equipment (UE), comprising:
   a memory; and
   at least one processor coupled to the memory and configured to:
   receive sensor information indicative of a direction of a current serving beam relative to the UE, the UE configured to communicate with a base station based on a beam pair link (BPL) associated with the direction of the current serving beam;
   learn a base station beam codebook based on the sensor information indicative of the direction of the current serving beam relative to the UE, wherein the base station beam codebook indicates directions associated with synchronization signal blocks (SSBs) of the base station and corresponding beam widths of the SSBs of the base station;
   perform a measurement for the base station and the UE to communicate over the BPL based on the sensor information indicating that the direction of the current serving beam relative to the UE is different from a previous serving beam direction relative to the UE and based on the base station beam codebook;
   estimate the direction of the current serving beam relative to the UE based on at least one of one or more degrees of freedom (DoF) information or one or more camera frames indicated via the sensor information; and
   switch, based on the estimated direction of the current serving beam, from a first beam associated with the BPL to a second beam associated with the BPL based on the measurement, the first beam corresponding to the previous serving beam direction relative to the UE, the second beam corresponding to the direction of the current serving beam relative to the UE.

2. The apparatus of claim 1, wherein the sensor information corresponds to extended reality (XR) perception information.

3. The apparatus of claim 1, wherein the one or more DoF information includes at least one of rotation information of the UE or translation information of the UE indicated via the sensor information.

4. The apparatus of claim 1, wherein the at least one processor is further configured to prioritize the measurement of a communication beam associated with the direction of the current serving beam relative to the UE for the UE to communicate with the base station over the BPL.

5. The apparatus of claim 1, wherein the at least one processor is further configured to select, from a UE beam codebook, a communication beam to communicate with the base station based on the BPL associated with the direction of the current serving beam.

6. The apparatus of claim 5, wherein to select the communication beam, the at least one processor is configured to select the communication beam from the UE beam codebook based on at least one of predicted movement of the UE or a beam search space associated with a subset of UE beams.

7. The apparatus of claim 1, wherein the at least one processor is further configured to generate a lookup table based on at least one of the one or more DoF information or the one or more camera frames indicated via the sensor information, and wherein to generate the lookup table, the at least one processor is configured to generate the lookup table to learn the base station beam codebook.

8. The apparatus of claim 1, wherein to learn the base station beam codebook, the at least one processor is configured to learn the base station beam codebook based on a non-linear function indicative of a reference signal received power (RSRP) associated with one or more parameters.

9. The apparatus of claim 8, wherein the non-linear function indicative of the RSRP is based on at least one of the one or more DoF information or the one or more camera frames indicated via the sensor information.

10. The apparatus of claim 8, wherein the one or more parameters associated with the non-linear function include at least one of UE location, UE orientation, base station location, UE beam identifier (ID), UE beam direction, base station synchronization signal block (SSB) beam ID, or base station SSB beam direction.

11. The apparatus of claim 1, wherein the at least one processor is further configured to transmit a request to receive a particular communication beam from the base station for communicating with the base station based on the BPL associated with the direction of the current serving beam.

12. The apparatus of claim 1, wherein to perform the measurement, the at least one processor is configured to perform the beam measurement based on a subset of SSBs in the SSBs, wherein the subset of SSBs points in a first direction toward a location of the UE.

13. A method of wireless communication at a user equipment (UE), comprising:
   receiving sensor information indicative of a direction of a current serving beam relative to the UE, the UE configured to communicate with a base station based on a beam pair link (BPL) associated with the direction of the current serving beam;
   learning a base station beam codebook based on the sensor information indicative of the direction of the current serving beam relative to the UE, wherein the base station beam codebook indicates directions associated with synchronization signal blocks (SSBs) of the base station and corresponding beam widths of the SSBs of the base station;
   performing a measurement for the base station and the UE to communicate over the BPL based on the sensor information indicating that the direction of the current serving beam relative to the UE is different from a previous serving beam direction relative to the UE and based on the base station beam codebook;
   estimating the direction of the current serving beam relative to the UE based on at least one of one or more degrees of freedom (DoF) information or one or more camera frames indicated via the sensor information; and
   switching, based on the estimated direction of the current serving beam, from a first beam associated with the BPL to a second beam associated with the BPL based on the measurement, the first beam corresponding to the previous serving beam direction relative to the UE, the second beam corresponding to the direction of the current serving beam relative to the UE.

14. The method of claim 13, wherein the sensor information corresponds to extended reality (XR) perception information.

15. The method of claim 13, wherein the one or more DoF information includes at least one of rotation information of the UE or translation information of the UE indicated via the sensor information.

16. The method of claim 13, further comprising prioritizing the measurement of a communication beam associated with the direction of the current serving beam relative to the UE for the UE to communicate with the base station over the BPL.

17. The method of claim 13, further comprising selecting, from a UE beam codebook, a communication beam to communicate with the base station based on the BPL associated with the direction of the current serving beam.

18. The method of claim 17, wherein the communication beam is selected from the UE beam codebook based on at least one of predicted movement of the UE or a beam search space associated with a subset of UE beams.

19. The method of claim 13, further comprising generating a lookup table based on at least one of the one or more DoF information or the one or more camera frames indicated via the sensor information, the lookup table generated to learn the base station beam codebook.

20. The method of claim 13, wherein the base station beam codebook is learned based on a non-linear function indicative of a reference signal received power (RSRP) associated with one or more parameters.

21. The method of claim 20, wherein the non-linear function indicative of the RSRP is based on at least one of the one or more DoF information or the one or more camera frames indicated via the sensor information.

22. The method of claim 20, wherein the one or more parameters associated with the non-linear function include at least one of UE location, UE orientation, base station location, UE beam identifier (ID), UE beam direction, base station synchronization signal block (SSB) beam ID, or base station SSB beam direction.

23. The method of claim 13, further comprising transmitting a request to receive a particular communication beam from the base station for communicating with the base station based on the BPL associated with the direction of the current serving beam.

24. An apparatus for wireless communication at a user equipment (UE), comprising:
   means for receiving sensor information indicative of a direction of a current serving beam relative to the UE, the UE configured to communicate with a base station based on a beam pair link (BPL) associated with the direction of the current serving beam;
   means for learning a base station beam codebook based on the sensor information indicative of the direction of the current serving beam relative to the UE, wherein the base station beam codebook indicates directions associated with synchronization signal blocks (SSBs) of the base station and corresponding beam widths of the SSBs of the base station;
   means for performing a measurement for the base station and the UE to communicate over the BPL based on the sensor information indicating that the direction of the current serving beam relative to the UE is different from a previous serving beam direction relative to the UE and based on the base station beam codebook;
   means for estimating the direction of the current serving beam relative to the UE based on at least one of one or more degrees of freedom (DoF) information or one or more camera frames indicated via the sensor information; and
   means for switching, based on the estimated direction of the current serving beam, from a first beam associated with the BPL to a second beam associated with the BPL based on the measurement, the first beam corresponding to the previous serving beam direction relative to the UE, the second beam corresponding to the direction of the current serving beam relative to the UE.

25. A non-transitory computer-readable medium storing computer executable code at a user equipment (UE), the code when executed by at least one processor causes the at least one processor to:
   receive sensor information indicative of a direction of a current serving beam relative to the UE, the UE configured to communicate with a base station based on a beam pair link (BPL) associated with the direction of the current serving beam;
   learn a base station beam codebook based on the sensor information indicative of the direction of the current serving beam relative to the UE, wherein the base station beam codebook indicates directions associated with synchronization signal blocks (SSBs) of the base station and corresponding beam widths of the SSBs of the base station;
   perform a measurement for the base station and the UE to communicate over the BPL based on the sensor information indicating that the direction of the current serving beam relative to the UE is different from a previous serving beam direction relative to the UE and based on the base station beam codebook;
   estimate the direction of the current serving beam relative to the UE based on at least one of one or more degrees of freedom (DoF) information or one or more camera frames indicated via the sensor information; and switch, based on the estimated direction of the current serving beam, from a first beam associated with the BPL to a second beam associated with the BPL based on the measurement, the first beam corresponding to the previous serving beam direction relative to the UE, the second beam corresponding to the direction of the current serving beam relative to the UE.

* * * * *